(12) United States Patent
Pu et al.

(10) Patent No.: US 11,808,319 B2
(45) Date of Patent: Nov. 7, 2023

(54) HORIZONTALLY ARRANGED SIX-DEGREE-OF-FREEDOM CONSTANT-STIFFNESS MECHANISM

(71) Applicants: Chongqing University, Chongqing (CN); Shanghai University, Shanghai (CN)

(72) Inventors: Huayan Pu, Chongqing (CN); Tong Wang, Chongqing (CN); Qimin Li, Chongqing (CN); Jinglei Zhao, Chongqing (CN); Jun Luo, Chongqing (CN); Jie Ma, Chongqing (CN)

(73) Assignees: Chongqing University, Chongqing (CN); Shanghai University, Shanghai (CN)

( * ) Notice: Subject to any disclaimer, the term of this patent is extended or adjusted under 35 U.S.C. 154(b) by 352 days.

(21) Appl. No.: 17/373,248

(22) Filed: Jul. 12, 2021

(65) Prior Publication Data

US 2022/0243782 A1   Aug. 4, 2022

(30) Foreign Application Priority Data

Jan. 29, 2021 (CN) .......................... 202110123994.6

(51) Int. Cl.
  *F16F 15/00* (2006.01)
  *F16F 15/03* (2006.01)
  *F16F 15/04* (2006.01)

(52) U.S. Cl.
  CPC .............. *F16F 15/03* (2013.01); *F16F 15/04* (2013.01); *F16F 2222/06* (2013.01); *F16F 2228/063* (2013.01); *F16F 2228/066* (2013.01)

(58) Field of Classification Search
  None
  See application file for complete search history.

(56) References Cited

U.S. PATENT DOCUMENTS

| | | | | |
|---|---|---|---|---|
| 9,777,793 | B1* | 10/2017 | Chen ..................... | G05B 19/402 |
| 2004/0212794 | A1* | 10/2004 | Mizuno ................. | G03B 27/58 |
| | | | | 355/75 |
| 2007/0024829 | A1* | 2/2007 | Mizuno ............... | G03F 7/70825 |
| | | | | 355/18 |
| 2009/0134557 | A1* | 5/2009 | Spangler .................. | B60N 2/38 |
| | | | | 297/217.3 |

(Continued)

*Primary Examiner* — Steven M Marsh
(74) *Attorney, Agent, or Firm* — Fish IP Law, LLP

(57) ABSTRACT

A horizontally arranged six-degree-of-freedom constant-stiffness mechanism is provided, and includes an upper platform, a bottom plate, three composite spherical hinges, spherical hinges, support rods, guide rail slider assemblies, and six electromagnetic adjustable stiffness units. Two ends of a shaft on which a permanent magnet is fixed in each electromagnetic adjustable stiffness unit are fixed to the bottom plate via shaft supports. Axially moving housings of electromagnetic adjustable stiffness units are fixed on sliders of the guide rail slider assemblies via slider backing plates respectively. Guide rail slider assembles are fixed on the bottom plate. Tops of the housings are mounted with the spherical hinges respectively. A bottom of the upper platform is uniformly mounted with the composite spherical hinges. One end of each support rod is threadedly connected to a corresponding one of the spherical hinges, and another end is connected with a corresponding one of composite spherical hinges.

7 Claims, 6 Drawing Sheets

(56) References Cited

U.S. PATENT DOCUMENTS

2022/0003532 A1* 1/2022 Pu .......................... F16F 3/026
2022/0282766 A1* 9/2022 Pu .......................... F16F 15/08
2022/0402118 A1* 12/2022 Zhou ................... G03F 7/70725
2023/0045158 A1* 2/2023 Pu .......................... H02N 15/00

* cited by examiner

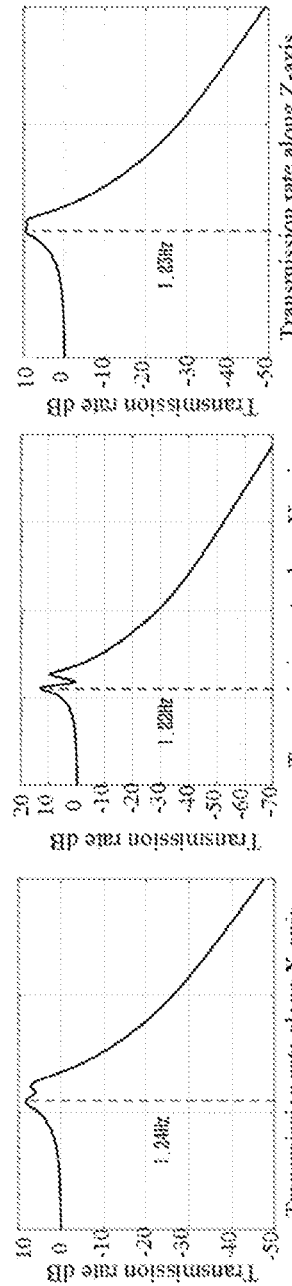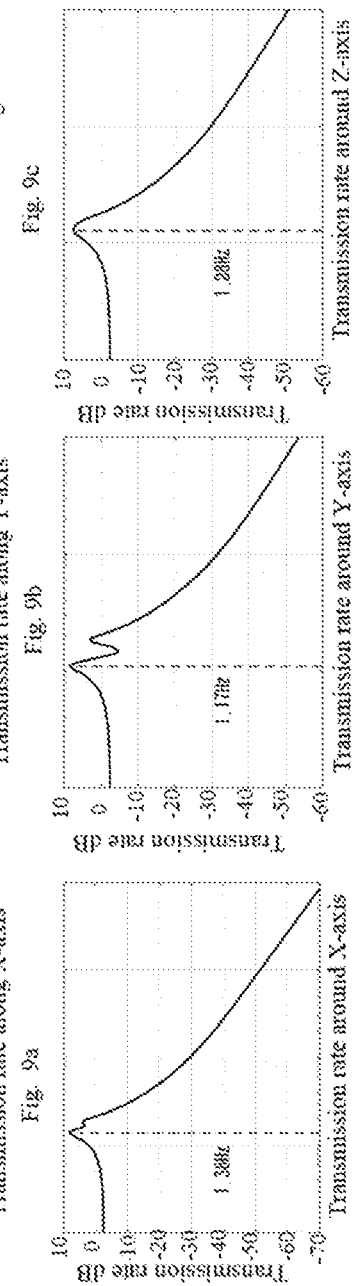
Fig. 9a Transmission rate along X-axis
Fig. 9b Transmission rate along Y-axis
Fig. 9c Transmission rate along Z-axis
Fig. 9d Transmission rate around X-axis
Fig. 9e Transmission rate around Y-axis
Fig. 9f Transmission rate around Z-axis

HORIZONTALLY ARRANGED SIX-DEGREE-OF-FREEDOM CONSTANT-STIFFNESS MECHANISM

CROSS REFERENCE TO RELATED APPLICATION

This patent application claims the benefit and priority of Chinese Patent Application No. 202110123994.6, titled "HORIZONTALLY ARRANGED SIX-DEGREE-OF-FREEDOM CONSTANT-STIFFNESS MECHANISM", filed on Jan. 29, 2021, the disclosure of which is incorporated by reference herein in its entirety.

TECHNICAL FIELD

The disclosure relates to the technical field of vibration isolation systems, and in particular to a horizontally arranged six-degree-of-freedom constant-stiffness mechanism.

BACKGROUND ART

In current industrial design, it have been shown by many design standards and experiences that factors such as stiffness, bearing capacity and sensitivity of a mechanism of the mechanical device, to a large extent, determine function and service life of the mechanical device. The stiffness of the mechanism, as an inherent property of the mechanical system, indicates the bearing capacity and an external-interference-resisting ability of the system. In the same mechanical device, changes in the position or attitude of the mechanism often result in changes in stiffness of the system during operation. And changes in stiffness may cause the bearing capacity of the system to decrease, or even change the natural frequency of the system to cause resonance.

SUMMARY

The purpose of the present disclosure is to provide a horizontally arranged six-degree-of-freedom constant-stiffness mechanism to solve the above mentioned problems of the prior art, which can keep a stiffness of the system constant by controlling current when the attitude or an external load of the system changes.

To achieve the above purpose, the present disclosure provides the following solutions. A horizontally arranged six-degree-of-freedom constant-stiffness mechanism is provided, which includes an upper platform, a bottom plate, three composite spherical hinges, spherical hinges, support rods, guide rail slider assemblies, and six electromagnetic adjustable stiffness units with a same structure, wherein in each of the electromagnetic adjustable stiffness units, two ends of a shaft on which a permanent magnet is fixed are fixed to the bottom plate via shaft supports, housings of the electromagnetic adjustable stiffness units move axially and are fixed on sliders of the guide rail slider assemblies via slider backing plates respectively, the guide rail slider assemblies are fixed on the bottom plate, top portions of the housings are mounted with the spherical hinges respectively, a bottom portion of the upper platform is uniformly mounted with the three composite spherical hinges, one end of each support rod is threadedly connected with a corresponding one of the spherical hinges, and another end of the support rod is threadedly connected with a corresponding one of the three composite spherical hinges.

Preferably, the six electromagnetic adjustable stiffness units are respectively a first electromagnetic adjustable stiffness unit, a second electromagnetic adjustable stiffness unit, a third electromagnetic adjustable stiffness unit, a fourth electromagnetic adjustable stiffness unit, a fifth electromagnetic adjustable stiffness unit and a sixth electromagnetic adjustable stiffness unit, the first electromagnetic adjustable stiffness unit and the second electromagnetic adjustable stiffness unit are arranged in parallel and two ends of the first electromagnetic adjustable stiffness unit are aligned with two ends of the second electromagnetic adjustable stiffness unit respectively, the third electromagnetic adjustable stiffness unit and the fourth electromagnetic adjustable stiffness unit are arranged in parallel and two ends of the third electromagnetic adjustable stiffness unit are aligned with two ends of the fourth electromagnetic adjustable stiffness unit respectively, the fifth electromagnetic adjustable stiffness unit and the sixth electromagnetic adjustable stiffness unit are arranged in parallel and two ends of the fifth electromagnetic adjustable stiffness unit are aligned with two ends of the sixth electromagnetic adjustable stiffness unit respectively; a perpendicular line of the first electromagnetic adjustable stiffness unit, a vertical bisector of the third electromagnetic adjustable stiffness unit and a perpendicular line of the fifth electromagnetic adjustable stiffness unit intersect at a center of the bottom plate, and an angle between two adjacent perpendicular lines is 120°.

Preferably, the support rods comprise six support rods, the six support rods are respectively a first support rod, a second support rod, a third support rod, a fourth support rod, a fifth support rod, and a sixth support rod; the three composite spherical hinges are respectively a first composite spherical hinge, a second composite spherical hinge, and a third composite spherical hinge; one end of the first support rod is connected to one of the spherical hinges which is arranged on the first electromagnetic adjustable stiffness unit, another end of the first support rod is connected to the third composite spherical hinge; one end of the second support rod is connected to one of the spherical hinges which is arranged on the second electromagnetic adjustable stiffness unit, another end of the second support rod is connected to the first composite spherical hinge; one end of the third support rod is connected to one of the spherical hinges which is arranged on the third electromagnetic adjustable stiffness unit, another end of the third support rod is connected to the second composite spherical hinge; one end of the fourth support rod is connected to one of the spherical hinges which is arranged on the fourth electromagnetic adjustable stiffness unit, another end of the fourth support rod is connected to the third composite spherical hinge; one end of the fifth support rod is connected to one of the spherical hinges which is arranged on the fifth electromagnetic adjustable stiffness unit, another end of the fifth support rod is connected to the first composite spherical hinge; one end of the sixth support rod is connected to one of the spherical hinges which is arranged on the sixth electromagnetic adjustable stiffness unit, another end of the sixth support rod is connected to the second composite spherical hinge.

Preferably, each electromagnetic adjustable stiffness unit comprises a first shaft support in the shaft supports, a first coil spring, a left cover, a right cover, a second coil spring, a second shaft support in the shaft supports and an arbor; two ends of the arbor are respectively assembled on the first shaft support and the second shaft support; the first coil spring, the left cover, a corresponding housing of the housings, the right cover and the second coil spring are sequentially assembled on the arbor from left to right; and a left end of the first coil spring is abutted against the first shaft support, and a right end of the second coil spring is abutted against the second shaft support.

Preferably, the electromagnetic adjustable stiffness units further comprises electromagnetic coils and the permanent magnet; the electromagnetic coils comprise six electromagnetic coils, the six electromagnetic coils are fixed in an inner cavity of the corresponding housing via the left cover and steps in an inner wall of the corresponding housing, the six electromagnetic coils do not slide with respect to the corresponding housing, adjacent two of the electromagnetic coils are in close contact with each other, current in the adjacent two electromagnetic coils is equal and opposite in direction; the permanent magnet is mounted on the arbor in the corresponding housing; and an inner diameter of each of the electromagnetic coils is greater than an outer diameter of the permanent magnet.

Preferably, the electromagnetic adjustable stiffness unit further comprises a first sliding bearing, a first permanent magnet fixing ring, a second permanent magnet fixing ring and a second sliding bearing, left and right ends of the corresponding one of the housings are machined with threaded holes, the left cover and the right cover are fixed to the corresponding one of the housings by bolts, the left cover is machined with threaded holes, the first sliding bearing is fixed to the left cover via bolts, the right cover is also machined with threaded holes, and the second sliding bearing is fixed to the right cover via bolts and nuts; the first permanent magnet fixing ring and the second permanent magnet fixing ring respectively limit two sides of the permanent magnet.

Preferably, each of the three composite spherical hinge comprises a base, a ball and socket cover and two spherical hinge heads; the base is fixed to the bottom of the upper platform via bolts, and the two spherical hinge heads are threadedly connected to the support rods after passing through the ball and socket cover respectively.

The present disclosure achieves the following beneficial technical effects relative to the prior art.

(1) The stiffness of each joint can be adjusted by changing the stiffness of the springs at both ends of the unit, the number of permanent magnets and coils in this unit, and the magnitude of the current in the control coil, to change a electromagnetic force between the permanent magnets and the electromagnetic coils as well as a restoring force of the springs, thereby controlling the stiffness of the whole system to be constant.

(2) The stiffness adjustment units of the system are not installed on the support rods, and are arranged horizontally on a lower platform, i.e., the bottom plate, thereby effectively reducing a rotational inertia of each support rod, which is beneficial to reduce the nonlinearity influence of system and improve the adjustment performance of the stiffness of the system.

(3) The stiffness of the system can be actively adjusted and kept constant based on requirements for the magnitude of the load, the strength of external excitation and the level of the vibration resistance, thereby achieving the purpose of improving the ability of the system to resist different strength interference, expanding the adjustable range of the stiffness of the system and the applicability of the system. At the same time, the system can adapt to different load requirements because the magnitude of electromagnetic force can be achieved by adjusting the magnitude of current. In addition, when the upper platform is in different postures in space, the stiffness of each joint can be controlled by a spring force and an adjustable electromagnetic force, and finally the stiffness of the system is achieved to be constant. In other words, the system can maintain the constant stiffness under different load conditions and the posture of the upper platform.

(4) From an equation of degrees of freedom of the mechanism, the number of degrees of freedom of the system is six, which achieves the constant stiffness of mechanism in terms of six-degrees-of-freedom in space and further improves the adaptability to complex vibration sources.

BRIEF DESCRIPTION OF THE DRAWINGS

In order to explain embodiments of the present disclosure or the technical solutions in the prior art more clearly, the following will briefly introduce drawings needed in the embodiments. Obviously, the drawings in the following description are only some of the present disclosure. For those of ordinary skill in the art, without creative work, other drawings can be obtained based on these drawings.

FIG. 9a is a transmission rate of a system in directions at an initial state thereof;

FIG. 9b is another transmission rate of a system in directions at an initial state thereof;

FIG. 9c is yet another transmission rate of a system in directions at an initial state thereof;

FIG. 9d is yet another transmission rate of a system in directions at an initial state thereof;

FIG. 9e is yet another transmission rate of a system in directions at an initial state thereof;

FIG. 9f is yet another transmission rate of a system in directions at an initial state thereof;

Figure 1:
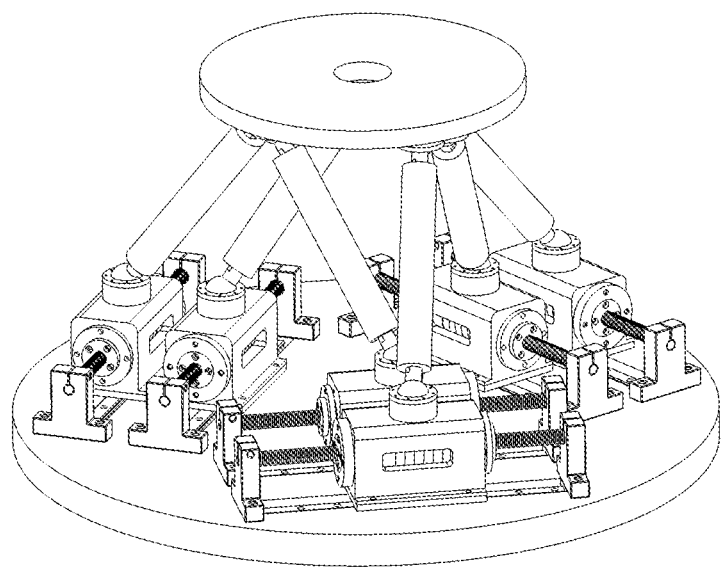
FIG. 1 is an axonometric drawing of a horizontally arranged six-degree-of-freedom constant-stiffness mechanism.

List of reference numbers: 1 upper platform; 2 composite spherical hinge; 201 ball and socket cover; 202 base; 203 spherical hinge head; 204 spherical hinge head; 3 support rod; 4 spherical hinge; 401 spherical hinge head; 402 base; 5 electromagnetic adjustable stiffness unit; 501 first shaft support; 502 first coil spring; 503 left cover; 504 housing; 505 right cover; 506 second coil spring; 507 second shaft support; 508 arbor; 509 first sliding bearing; 510 first permanent magnet fixing ring; 511 electromagnetic coil; 512 permanent magnet; 513 second permanent magnet fixing ring; 514 sliding bearing; 6 guide rail slider assembly; 601 slider backing plate; 602 slider; 603 guide rail; 7 bottom plate.

DETAILED DESCRIPTION OF THE EMBODIMENTS

The technical solutions in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

The purpose of the present invention is to provide a horizontally arranged six-degree-of-freedom constant-stiffness mechanism to solve the above-mentioned problems in the prior art. When the attitude or external load of the system changes, the stiffness of the system can be kept constant by controlling current.

In order to make the above objectives, features and advantages of the present disclosure more obvious and understandable, the present disclosure will be further described in detail below with reference to the accompanying drawings and specific embodiments.

As shown in FIGS. 1-10, a horizontally arranged six-degree-of-freedom constant-stiffness mechanism is provided, which includes an upper platform 1, a bottom plate 7, composite spherical hinges 2, spherical hinges 4, support rods 3, guide rail slider assemblies 6, and six electromagnetic adjustable stiffness units 5 with a same structure. Two ends of a shaft on which a permanent magnet 512 is fixed in each electromagnetic adjustable stiffness unit 5 are fixed on the bottom plate 7 via shaft supports. The axially moving housing 504 of the electromagnetic adjustable stiffness unit 5 is fixed to a slider 602 of the guide rail slider assembly via a slider backing plate 601, and the guide rail slider assembly 6 is fixed on the bottom plate 7. A top of the housing 504 is mounted with the spherical hinge 4. Three composite spherical hinges 2 are uniformly installed on the bottom of the upper platform 1. One end of the support rod 3 is threadedly connected with the spherical hinge 4, and another end of the support rod 3 is threadedly connected with the composite spherical hinge 2.

The six electromagnetic adjustable stiffness units 5 are respectively a first electromagnetic adjustable stiffness unit, a second electromagnetic adjustable stiffness unit, a third electromagnetic adjustable stiffness unit, a fourth electromagnetic adjustable stiffness unit, a fifth electromagnetic adjustable stiffness unit, and a sixth electromagnetic adjustable stiffness unit. The first electromagnetic adjustable stiffness unit and the second electromagnetic adjustable stiffness unit are arranged in parallel, and two ends of the first electromagnetic adjustable stiffness unit are aligned with two ends of the second electromagnetic adjustable stiffness unit. The third electromagnetic adjustable stiffness unit and the fourth electromagnetic adjustable stiffness unit are arranged in parallel, and two ends of the third electromagnetic adjustable stiffness unit are aligned with two ends of the fourth electromagnetic adjustable stiffness unit. And the fifth electromagnetic adjustable stiffness unit and the sixth electromagnetic adjustable stiffness unit are arranged in parallel, and two ends of the fifth electromagnetic adjustable stiffness unit are aligned with two ends of the sixth electromagnetic adjustable stiffness. A perpendicular line of the first electromagnetic adjustable stiffness unit, a perpendicular line of the third electromagnetic adjustable stiffness unit and a perpendicular line of the fifth electromagnetic adjustable stiffness unit intersect at a center of the bottom plate and an intersection angle between two adjacent perpendicular lines is 120°. The perpendicular line may be a line that extends perpendicular to the arbor fixed with the permanent magnet and parallel to a plane of the bottom plate from a center of the arbor.

The support rods 3 include six support rods. The six support rods are respectively a first support rod, a second support rod, a third support rod, a fourth support rod, a fifth support rod and a sixth support rod. And the three composite spherical hinges are respectively a first composite spherical hinge, a second composite spherical hinge and a third composite spherical hinge. One end of the first support rod is connected to one of the spherical hinges which is located on the top of the housing of the first electromagnetic adjustable stiffness unit, another end of the first support rod is connected to the third composite spherical hinge. One end of the second support rod is connected to one of the spherical hinges which is located on the top of the housing of the second electromagnetic adjustable stiffness unit, and another end of the second support rod is connected to the first composite spherical hinge. One end of the third support rod is connected to one of the spherical hinges which is located on the top of the housing of the third electromagnetic adjustable stiffness unit, and another end of the third support rod is connected to the second composite spherical hinge. One end of the fourth support rod is connected to one of the spherical hinges which is located on the top of the housing of the fourth electromagnetic adjustable stiffness unit, and another end of the fourth support rod is connected to the third composite spherical hinge. One end of the fifth support rod is connected to one of the spherical hinges which is located on the top of the housing of the fifth electromagnetic adjustable stiffness unit, and another end of the fifth support rod is connected to the first composite spherical hinge. One end of the sixth support rod is connected to one of the spherical hinges which is located on the top of the housing of the sixth electromagnetic adjustable stiffness unit, and another end of the sixth support rod is connected to the second composite spherical hinge.

Figure 3:
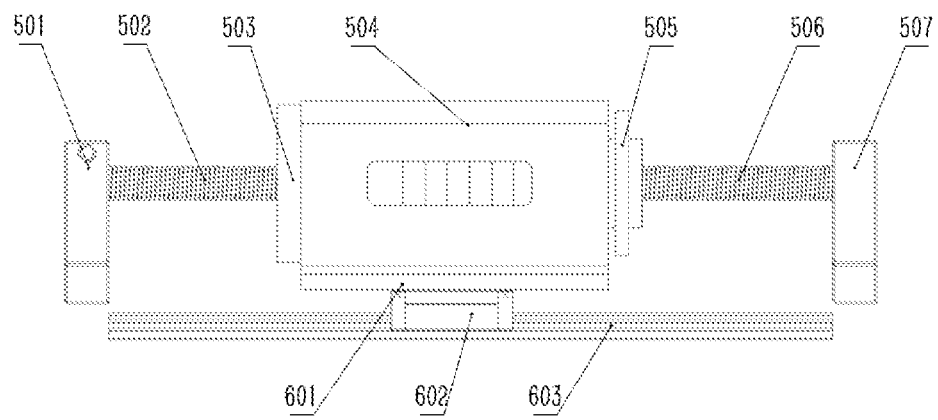
FIG. 3 is a front view of an electromagnetic adjustable stiffness unit.
Figure 4:
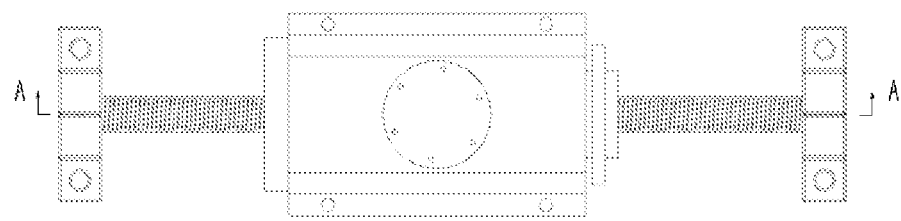
FIG. 4 is a top view of the electromagnetic adjustable stiffness unit.
Figure 5:
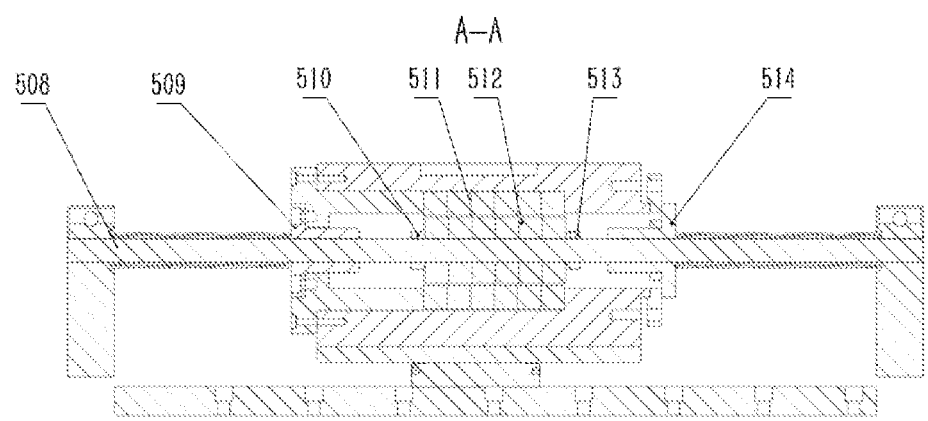
FIG. 5 is a cross-sectional view of the electromagnetic adjustable stiffness unit.

In this embodiment, as shown in FIGS. 3-5, the electromagnetic adjustable stiffness unit includes a first shaft support 501, a first coil spring 502, a left cover 503, the housing 504, a right cover 505, a second coil spring 506, a second shaft support 507, the arbor 508, a first sliding bearing 509, a first permanent magnet fixing ring 510, electromagnetic coils 511, a permanent magnet 512, a second permanent magnet fixing ring 513, and a second sliding bearing 514. The housing 504 is fixed to the slider 602 by the slider backing plate 601, and the slider 602 can slide along the guide rail 603. Two ends of the arbor 508 are respectively assembled on the first shaft support 501 and the second shaft support 507. The first coil spring 502, the left cover 503, the housing 504, the right cover 505 and the second coil spring 506 are sequentially assembled on the arbor 508 from left to right. And a left end of the first coil spring 502 is abutted with the first shaft support 501, and a right end of the second coil spring 506 is abutted with the second shaft support 507. Furthermore, the first permanent magnet fixing ring 510 and the second permanent magnet fixing ring 513 respectively limit two sides of the permanent magnet 512.

The housing 504 is fixed with six electromagnetic coils 511 via the left cover 503 and steps in an inner wall of this housing. The electromagnetic coils are not slid with respect to the housing. Adjacent two electromagnetic coils 511 are in close contact with each other. In order to facilitate the observation whether the electromagnetic coils 511 are installed in place, a recess is machined on the housing 504. Current in the adjacent two electromagnetic coils 511 is equal and opposite in direction when the external power supply provides power during usage. The permanent magnet is mounted on the arbor 508 in the housing 504. And an inner diameter of the electromagnetic coil 511 is greater than an outer diameter of the permanent magnet 512. So, when the housing 504 moves axially on the arbor 508 through the first sliding bearing 509 and the second sliding bearing 514 located at both ends, the movement interference will not occur among the electromagnetic coils 511 and the permanent magnet 512.

Left and right ends of the housing 504 are machined with threaded holes, and the left cover 503 and the right cover 505 are fixed via bolts. The left cover 503 is machined with threaded holes to which the first sliding bearing 509 can be fixed by bolts. And the right cover 505 is machined with threaded holes to which the second sliding bearing 514 can be fixed by bolts and nuts.

Positioning holes and threaded holes are machined on an upper surface of the housing 504, and the base 402 of the spherical hinge 4 can be fixed by bolts. The bottom portion of the upper platform 1 is also machined with threaded holes, and the composite spherical hinge 2 can be fixed on the bottom portion of the upper platform 1 by bolts. The positioning holes are machined on a right surface of the shaft support 501 to position a left end of the first coil spring 502.

Figure 6:
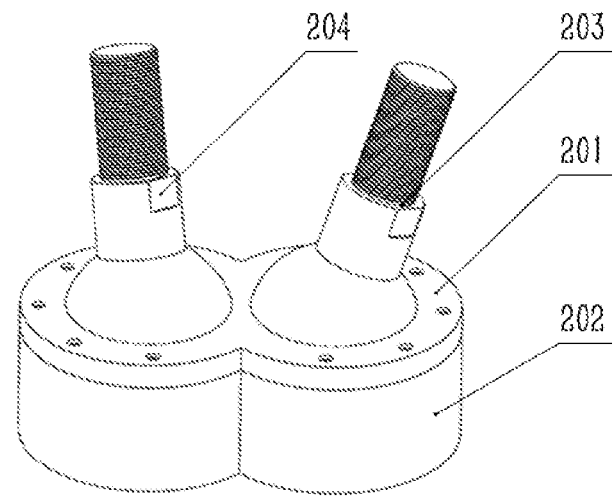
FIG. 6 is a schematic diagram of a structure of a composite spherical hinge.
Figure 7:
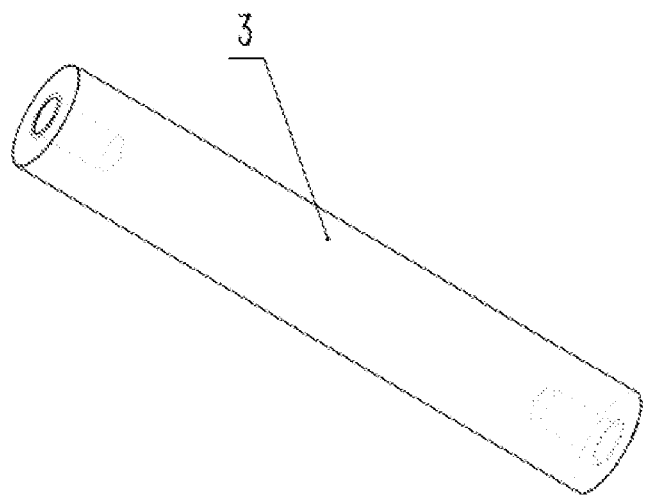
FIG. 7 is a schematic diagram of a structure of a support rod.
Figure 8:
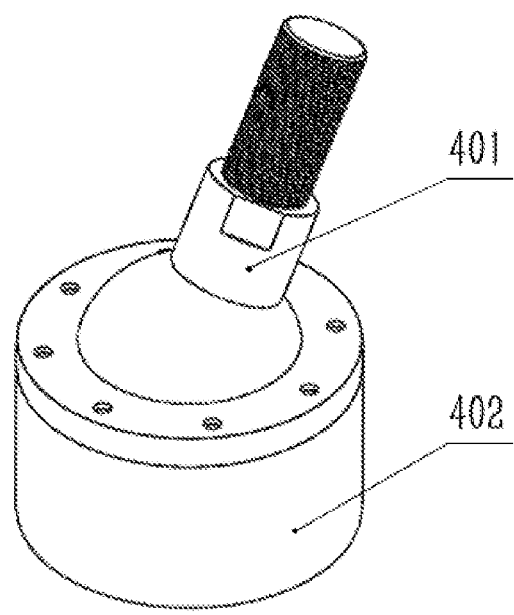
FIG. 8 is a schematic diagram of a structure of a spherical hinge.

As shown in FIG. 6, the composite spherical hinge 2 includes a base 202, a ball and socket cover 201, and spherical hinge heads 204, 203. The base 202 can be fixed to the upper platform 1 by bolts. The spherical hinge heads 203, 204 are threadedly connected with the support rods 3, respectively.

As shown in FIGS. 3-5, when the upper platform is subjected to a load and is in a certain required attitude, a load force is transmitted to the housing 504 through the support rods 3 and the spherical hinges 4, and thus the housing moves axially along the arbor 508. If the first coil spring 502 and the second coil spring 506 generates a deformation d and a restoring force $F_1$, the restoring force acts on the housing 504 through the first sliding bearing 509 and the second sliding bearing 514, and a direction of this restoring force is along a axial direction of the arbor 508. At the same time, an electromagnetic force $F_2$ is generated due to the interaction of the magnetic field among the permanent magnet 512 and energized electromagnetic coils 511, and this electromagnetic force $F_2$ also acts on the housing 504 along the axial direction of the arbor 508. When working, a direction of current in the electromagnetic coils is adjusted to make directions of both the electromagnetic force $F_2$ and the restoring force $F_1$ to be opposite. In this way, a resultant force on the housing is $F=F_1-F_2$, and an expression of the stiffness is $$K = \frac{F_1 - F_2}{d}.$$

Figure 2:
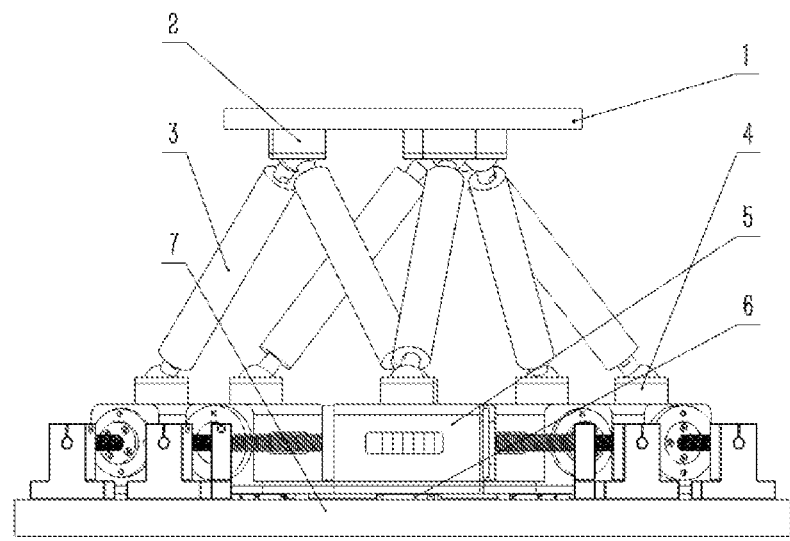
FIG. 2 is a front view of a horizontally arranged six-degree-of-freedom constant-stiffness mechanism.

The current passing through the electromagnetic coils 511 may be changed to change the electromagnetic force $F_2$, thereby changing the stiffness of the unit. Obviously, the current in the coil can be adjusted as required, and then the stiffness of the system can be adjusted to an expected value. When the current does not change, the stiffness of the system will also be constant. As shown in FIG. 2, six modules with variable stiffness are arranged crosswise, and the stiffness of each unit can be adjusted independently. It can be seen from a relationship between the stiffness of the system and the stiffness of the unit that the stiffness of the system will also be determined and remain unchanged, when the stiffness of each unit is constant.

FIG. 9a, FIG. 9b, FIG. 9c, FIG. 9d, FIG. 9e and FIG. 9f show transmission rates of the system in each direction, i.e., along X-axis, Y-axis and Z-axis, respectively, at an initial state. Particularly, FIG. 9a shows the transmission rate of the natural frequency along the X axis in the system. FIG. 9d shows that the transmission rate of the vibration in the system around the X axis.

Figure 10A:
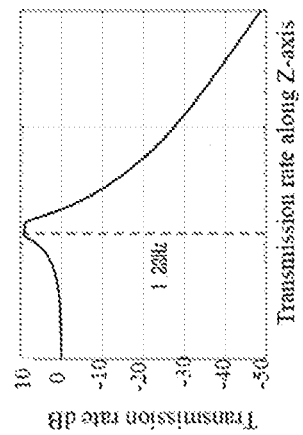
FIG. 10a is a transmission rate of the system in directions when an upper platform is tilted upward by 3°.
Figure 10B:
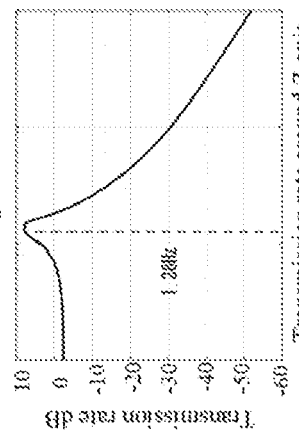
FIG. 10b is another transmission rate of the system in directions when an upper platform is tilted upward by 3°.
Figure 10D:
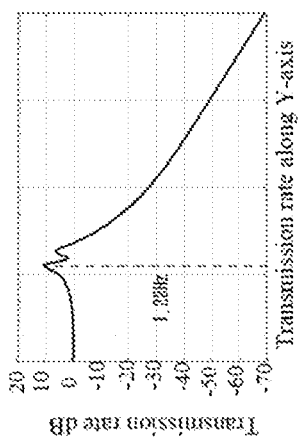
FIG. 10d is yet another transmission rate of the system in directions when an upper platform is tilted upward by 3°.
Figure 10E:
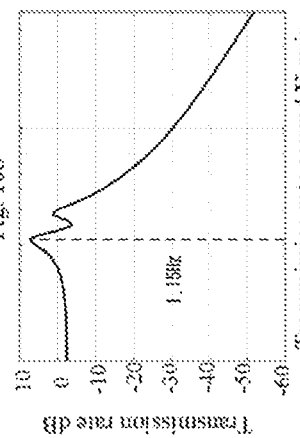
FIG. 10e is yet another transmission rate of the system in directions when an upper platform is tilted upward by 3°.
Figure 10C:
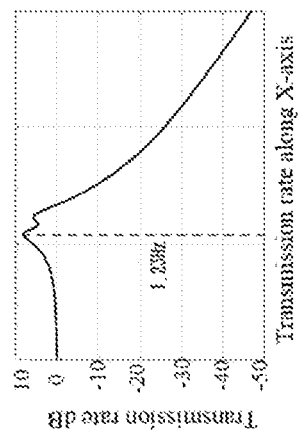
FIG. 10c is yet another transmission rate of the system in directions when an upper platform is tilted upward by 3°.
Figure 10F:
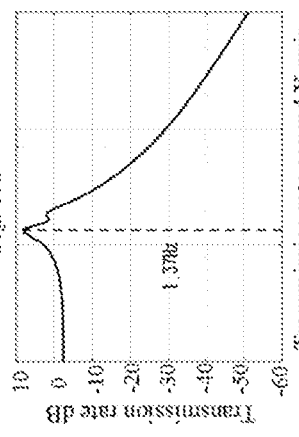
FIG. 10f is yet another transmission rate of the system in directions when an upper platform is tilted upward by 3°.

FIG. 10a, FIG. 10b, FIG. 10c, FIG. 10d, FIG. 10e and FIG. 10f show the transmission rates of the system in each direction, i.e., along the X-axis, Y-axis and Z-axis, respectively, when the upper platform is tilted upward by 3°. Particularly, FIG. 10a shows the transmission rate of the natural frequency in the system along the X axis. FIG. 10d shows that the transmission rate of the vibration in the system around the X axis.

It should be noted that for those skilled in the art, it is obvious that the present disclosure is not limited to the details of the above exemplary embodiments, and the present disclosure can be implemented in other specific forms without departing from the spirit or basic characteristics of the present disclosure. Therefore, from any viewpoint, the embodiments should be regarded as exemplary and non-limiting. The scope of the present disclosure is defined by the appended claims rather than the above description. Therefore. all changes within the definition and the scope of the equivalent elements of the claims are intended to be included in the present disclosure, and any reference signs in the claims should not be regarded as limiting the involved claims.

In the present disclosure, specific examples are used to illustrate the principles and implementation of the present disclosure. The description of the above examples is only used to help understand the method and the core idea of the present disclosure. At the same time, for those of ordinary skill in the art, according to this idea of the disclosure, there will be changes in the specific implementation and the application scope. In summary, the content of this specification should not be construed as a limitation to the present disclosure.

What is claimed is:

1. A horizontally arranged six-degree-of-freedom constant-stiffness mechanism, comprising an upper platform, a bottom plate, three composite spherical hinges, spherical hinges, support rods, guide rail slider assemblies, and six electromagnetic adjustable stiffness units with a same structure, wherein in each of the electromagnetic adjustable stiffness units, two ends of a shaft on which a permanent magnet is fixed are fixed to the bottom plate via shaft supports, housings of the electromagnetic adjustable stiffness units move axially and are fixed on sliders of the guide rail slider assemblies via slider backing plates respectively, the guide rail slider assembles are fixed on the bottom plate, top portions of the housings are mounted with the spherical hinges respectively, a bottom portion of the upper platform is uniformly mounted with the three composite spherical hinges, one end of each support rod is threadedly connected with a corresponding one of the spherical hinges, and another end of the support rod is threadedly connected with a corresponding one of the three composite spherical hinges.

2. The horizontally arranged six-degree-of-freedom constant-stiffness mechanism according to claim 1, wherein the six electromagnetic adjustable stiffness units are respectively a first electromagnetic adjustable stiffness unit, a second electromagnetic adjustable stiffness unit, a third electromagnetic adjustable stiffness unit, a fourth electromagnetic adjustable stiffness unit, a fifth electromagnetic adjustable stiffness unit and a sixth electromagnetic adjustable stiffness unit, the first electromagnetic adjustable stiffness unit and the second electromagnetic adjustable stiffness unit are arranged in parallel and two ends of the first electromagnetic adjustable stiffness unit are aligned with two ends of the second electromagnetic adjustable stiffness unit respectively, the third electromagnetic adjustable stiffness unit and the fourth electromagnetic adjustable stiffness unit are arranged in parallel and two ends of the third electromagnetic adjustable stiffness unit are aligned with two ends of the fourth electromagnetic adjustable stiffness unit respectively, the fifth electromagnetic adjustable stiffness unit and the sixth electromagnetic adjustable stiffness unit are arranged in parallel and two ends of the fifth electromagnetic adjustable stiffness unit are aligned with two ends of the sixth electromagnetic adjustable stiffness unit respectively; a perpendicular line of the first electromagnetic adjustable stiffness unit, a vertical bisector of the third electromagnetic adjustable stiffness unit and a perpendicular line of the fifth electromagnetic adjustable stiffness unit intersect at a center of the bottom plate, and an angle between two adjacent perpendicular lines is 120°.

3. The horizontally arranged six-degree-of-freedom constant-stiffness mechanism according to claim 2, wherein the support rods comprise six support rods, the six support rods are respectively a first support rod, a second support rod, a third support rod, a fourth support rod, a fifth support rod, and a sixth support rod; the three composite spherical hinges are respectively a first composite spherical hinge, a second composite spherical hinge, and a third composite spherical hinge; one end of the first support rod is connected to one of the spherical hinges which is arranged on the first electromagnetic adjustable stiffness unit, another end of the first support rod is connected to the third composite spherical hinge; one end of the second support rod is connected to one of the spherical hinges which is arranged on the second electromagnetic adjustable stiffness unit, another end of the second support rod is connected to the first composite spherical hinge; one end of the third support rod is connected to one of the spherical hinges which is arranged on the third electromagnetic adjustable stiffness unit, another end of the third support rod is connected to the second composite spherical hinge; one end of the fourth support rod is connected to one of the spherical hinges which is arranged on the fourth electromagnetic adjustable stiffness unit, another end of the fourth support rod is connected to the third composite spherical hinge; one end of the fifth support rod is connected to one of the spherical hinges which is arranged on the fifth electromagnetic adjustable stiffness unit, another end of the fifth support rod is connected to the first composite spherical hinge; one end of the sixth support rod is connected to one of the spherical hinges which is arranged on the sixth electromagnetic adjustable stiffness unit, another end of the sixth support rod is connected to the second composite spherical hinge.

4. The horizontally arranged six-degree-of-freedom constant-stiffness mechanism according to claim 1, wherein each electromagnetic adjustable stiffness unit comprises a first shaft support in the shaft supports, a first coil spring, a left cover, a right cover, a second coil spring, a second shaft support in the shaft supports and an arbor; two ends of the arbor are respectively assembled on the first shaft support and the second shaft support; the first coil spring, the left cover, a corresponding housing of the housings, the right cover and the second coil spring are sequentially assembled on the arbor from left to right; and a left end of the first coil spring is abutted against the first shaft support, and a right end of the second coil spring is abutted against the second shaft support.

5. The horizontally arranged six-degree-of-freedom constant-stiffness mechanism according to claim 4, wherein the electromagnetic adjustable stiffness units further comprises electromagnetic coils and the permanent magnet; the electromagnetic coils comprise six electromagnetic coils, the six electromagnetic coils are fixed in an inner cavity of the corresponding housing via the left cover and steps in an inner wall of the corresponding housing, the six electromagnetic coils do not slide with respect to the corresponding housing, adjacent two of the electromagnetic coils are in close contact with each other, current in the adjacent two electromagnetic coils is equal and opposite in direction; the permanent magnet is mounted on the arbor in the corresponding housing; and an inner diameter of each of the electromagnetic coils is greater than an outer diameter of the permanent magnet.

6. The horizontally arranged six degree-of-freedom constant-stiffness mechanism according to claim 5, wherein the electromagnetic adjustable stiffness unit further comprises a first sliding bearing, a first permanent magnet fixing ring, a second permanent magnet fixing ring and a second sliding bearing, left and right ends of the corresponding one of the housings are machined with threaded holes, the left cover and the right cover are fixed to the corresponding one of the housings by bolts, the left cover is machined with threaded holes, the first sliding bearing is fixed to the left cover via bolts, the right cover is also machined with threaded holes, and the second sliding bearing is fixed to the right cover via bolts and nuts; the first permanent magnet fixing ring and the second permanent magnet fixing ring respectively limit two sides of the permanent magnet.

7. The horizontally arranged six-degree-of-freedom constant-stiffness mechanism according to claim 1, wherein each of the three composite spherical hinge comprises a base, a ball and socket cover and two spherical hinge heads; the base is fixed to the bottom of the upper platform via bolts, and the two spherical hinge heads are threadedly connected to the support rods after passing through the ball and socket cover respectively.

* * * * *